(12) United States Patent
Alshawabkeh et al.

(10) Patent No.: US 10,152,428 B1
(45) Date of Patent: Dec. 11, 2018

(54) VIRTUAL MEMORY SERVICE LEVELS

(71) Applicant: EMC IP HOLDING COMPANY LLC, Hopkinton, MA (US)

(72) Inventors: Malak Alshawabkeh, Franklin, MA (US); Owen Martin, Hopedale, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 12 days.

(21) Appl. No.: 15/649,130

(22) Filed: Jul. 13, 2017

(51) Int. Cl.
*G06F 12/10* (2016.01)
*G06F 12/1027* (2016.01)
*G06F 12/1009* (2016.01)
*G06F 12/128* (2016.01)
*G06F 12/123* (2016.01)
*G06F 9/455* (2018.01)

(52) U.S. Cl.
CPC ...... *G06F 12/1027* (2013.01); *G06F 12/1009* (2013.01); *G06F 12/123* (2013.01); *G06F 12/128* (2013.01); *G06F 9/45558* (2013.01); *G06F 2009/45583* (2013.01); *G06F 2212/621* (2013.01); *G06F 2212/65* (2013.01); *G06F 2212/68* (2013.01)

(58) Field of Classification Search
None
See application file for complete search history.

(56) References Cited

U.S. PATENT DOCUMENTS

| | | | |
|---|---|---|---|
| 5,561,814 A * | 10/1996 | Glew .................. | G06F 12/0888 710/13 |
| 2014/0115226 A1* | 4/2014 | Chandrakar ........ | G06F 12/0802 711/3 |
| 2018/0060255 A1* | 3/2018 | Speier .................... | G06F 3/061 |

\* cited by examiner

*Primary Examiner* — Kevin Verbrugge
(74) *Attorney, Agent, or Firm* — Anderson Gorecki LLP

(57) ABSTRACT

A service level is assigned to each application that uses virtual memory. The service level is used to select a type of memory used when paging-in data. The service level is used to select a type of storage used when paging out data. The service level is used to select a page to evict from memory, e.g. based on service level probabilities. The service level is used to select a number of contiguous pages to page-in, e.g. based on a service level scalar. Accesses (hits) to the pages in memory may be tracked, including contiguous pages that are paged-in based on the scalar. Pages with low hit frequency may be evicted. The scalar for an application may be adjusted when at least some of the contiguous pages are infrequently accessed.

20 Claims, 9 Drawing Sheets

Probability Table 500

| Service Level | Eviction Probability |
|---|---|
| 1 | 20% |
| 2 | 30% |
| 3 | 50% |
| 4 | 90% |
| 5 | 100% |

Figure 5

Page-In Bias Table 700

| Service Level | Scalar |
|---|---|
| 5 | 1x |
| 4 | 2x |
| 3 | 4x |
| 2 | 8x |
| 1 | 16x |

Figure 7

Hit Rate Table 800 for
Host Application 104

| Scalar | Hits |
|--------|------|
| 1x | 1000 |
| 2x | 500 |
| 4x | 10 |
| 8x | 0 |
| 16x | 0 |

Figure 8

VIRTUAL MEMORY SERVICE LEVELS

BACKGROUND

The subject matter of this disclosure is generally related to computers, and more particularly to virtual memory. Virtual memory is an abstraction of physical resources. For example, virtual memory may be used to provide more apparent memory capacity than is actually available by representing physical memory resources such as RAM (Random access Memory) and physical storage such as HDDs (Hard Disk Drives) as contiguous addresses of memory. However, performance may suffer because RAM exhibits lower latency than HDDs.

One environment in which virtual memory may be used is a data center. Servers, sometimes referred to as hosts, run data processing applications that may be referred to as host applications. Examples of host applications may include but are not limited to file servers, email servers, block servers and databases. Host application data may be maintained by storage arrays. In particular, the host application data is maintained on managed drives. Computing nodes such as storage servers manage access to the managed drives. For example, the computing nodes may present logical storage devices to the host servers for storage of the host application data, where the logical storage devices are backed by the managed drives. The host servers may access the host application data by sending IOs with reference to the logical storage devices. The storage arrays implement the IOs by accessing the managed drives based on metadata that provides a mapping between the logical storage devices and the managed drives. Virtual memory may be used by host and storage arrays.

SUMMARY

All examples, aspects and features mentioned in this document can be combined in any technically possible way.

In accordance with an aspect, an apparatus comprises: a physical memory; physical storage comprising a plurality of types of storage devices, each type differentiated from the other types by performance; at least one CPU (central processing unit) with applications running thereon, each application having a service level assigned thereto, the at least one CPU generating a first data access request associated with a first one of the applications, the first data access request comprising a virtual address; a TLB (translation lookaside buffer) responsive to the first data access request to determine that the virtual address does not correspond to a physical address in a physical memory, and to select a page for eviction from the memory to physical storage in order to free space for use in servicing the first request, wherein the selected page is paged-out to a type of storage device that is selected by the TLB based on the service level of the application associated with the selected page. In some implementations the physical memory comprises a plurality of types of memory devices, each type differentiated from the other types by performance, and wherein a page is paged-in from the physical storage to a type of memory device that is selected by the TLB based on the service level of the application associated with the page. In some implementations the first request comprises an indicator of the service level of the first application. In some implementations the TLB obtains a page scalar based on the service level of the first application, the page scalar indicating a number of contiguous pages to be paged-in to the physical memory from the physical storage in response to the first request. In some implementations the TLB selects the page for eviction from the memory based on the service levels of applications associated with pages in the memory. In some implementations each service level is associated with an eviction probability. In some implementations the pages in memory are considered for eviction in order of recent use from least recently used to most recently used. In some implementations the TLB is responsive to a second data access request to determine that a virtual address in that second request corresponds to a physical address in the physical memory, and to update a record of access to a page in the physical memory corresponding to the second request, including indicating whether the access is to a contiguous page paged-in in accordance with the page scalar. Some implementations comprise evicting from the physical memory the contiguous page paged-in in accordance with the page scalar based on number of hits. Some implementations comprise adjusting the page scalar of the application associated with the second data access request based on number of hits.

In accordance with an aspect a method comprises: in a node comprising a physical memory and physical storage comprising a plurality of types of storage devices, each type differentiated from the other types by performance, a TLB (translation lookaside buffer), and at least one CPU (central processing unit) with applications running thereon: assigning a service level to each application; the at least one CPU generating a first data access request associated with a first one of the applications, the first data access request comprising a virtual address; the TLB, responsive to the first data access request, determining that the virtual address does not correspond to a physical address in a physical memory; selecting a page for eviction from the memory to physical storage in order to free space for use in servicing the first request; selecting a type of storage device based on the service level of the application associated with the selected page; and paging-out the selected page to the selected type of storage device. In some implementations the physical memory comprises a plurality of types of memory devices, each type differentiated from the other types by performance, and the method comprises selecting a type of memory device based on the service level of the application associated with the page to be paged-in, and paging-in the page to the selected type of memory device. Some implementations comprise inserting, into the first request, an indicator of the service level of the first application. Some implementations comprise obtaining a page scalar based on the service level of the first application, the page scalar indicating a number of contiguous pages to be paged-in to the physical memory from the physical storage in response to the first request, and paging-in the indicated number of contiguous pages. Some implementations comprise selecting the page for eviction from the memory based on the service levels of applications associated with pages in the memory. Some implementations comprise associating an eviction probability with each service level. Some implementations comprise considering the pages in memory for eviction in order of recent use from least recently used to most recently used. Some implementations comprise, responsive to a second data access request, determining that a virtual address in that second request corresponds to a physical address in the physical memory, and updating a record of access to a page in the physical memory corresponding to the second request, including indicating whether the access is to a contiguous page paged-in in accordance with the page scalar. Some implementations comprise evicting from the physical memory the contiguous page paged-in in accordance with the page scalar based on number of hits. Some implementations comprise adjusting the page scalar of the application associated with the second data access request based on number of hits.

Other aspects, features and implementations may become apparent in view of the detailed description and figures.

BRIEF DESCRIPTION OF THE FIGURES

FIG. 5 illustrates a service level eviction probability table.

FIG. 7 illustrates a page-in bias table.

FIG. 8 illustrates a scalar hit rate table for an application.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible non-transitory features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
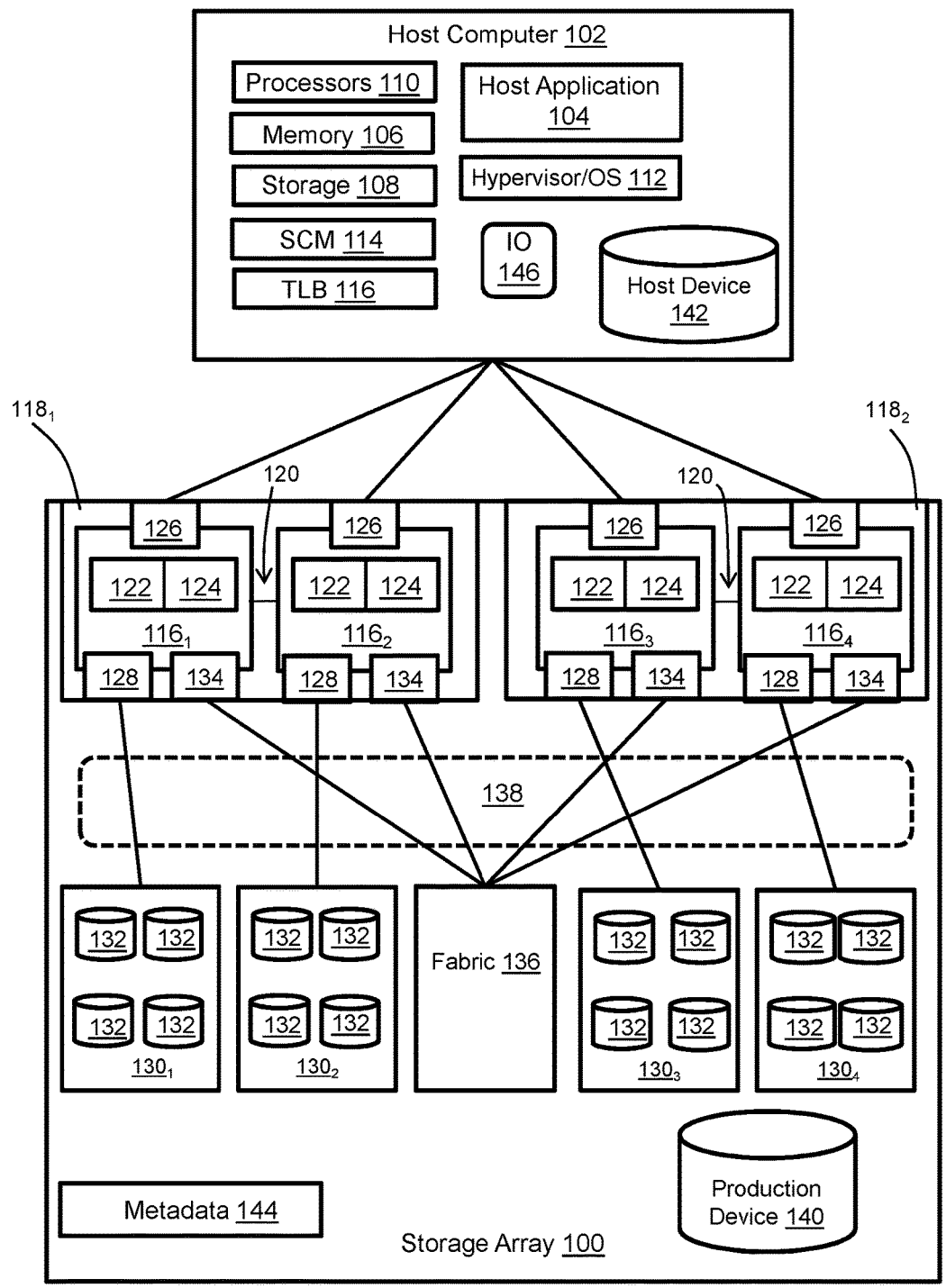
FIG. 1 illustrates a storage array and an associated host in which virtual memory service levels are implemented.

FIG. 1 illustrates an exemplary storage array 100 and associated host computer 102, of which there may be many. The storage array 100 maintains data for a host application 104, of which there may be more than one instance and type on the host computer. As will be explained below, service levels may be assigned to host applications and other applications in order to provide prioritized services related to data storage, e.g. services such as virtual memory.

In the illustrated example the host computer 102 is a "vanilla" server computer with volatile memory 106, persistent storage 108, one or more tangible processors 110, and a hypervisor or OS (operating system) 112. The volatile memory may include RAM (Random Access Memory) of any type. The persistent storage 108 may include tangible persistent storage components of one or more technology types, for example and without limitation SSDs such as flash, and HDDs (hard disk drives) such as SATA (Serial Advanced Technology Attachment) and FC (Fibre Channel). The host computer may also include SCM (Storage Class Memory) 114. SCM is an emerging storage technology that provides non-volatile storage with IO performance (e.g. latency) approaching that of low performance RAM. The host computer may also include a TLB (Translation Lookaside Buffer) 116 for supporting memory virtualization. Virtual memory may be used within the host computer to store host application instructions and host application data, for example and without limitation. The host computer 102 might support multiple virtual hosts running on virtual machines or containers, and although an external host computer is illustrated, internal hosts may be instantiated within the storage array.

The architecture and components of the storage array 100 may include "vanilla" storage servers or specially designed hardware for providing data storage services. In the illustrated example the storage array 100 includes a plurality of computing nodes $116_1$-$116_4$ such as storage directors, for example and without limitation. Pairs of the computing nodes, e.g. ($116_1$, $116_2$) and ($116_3$, $116_4$), may be organized as storage engines $118_1$, $118_2$, respectively, for purposes of failover between computing nodes. The paired computing nodes of each storage engine may be directly interconnected by communication links 120. Each computing node includes at least one tangible multi-core processor 122 and a local volatile memory 124. The local volatile memory 124 may include, for example and without limitation, components such as RAM. Each computing node may also include one or more FEs 126 (front-end directors, a.k.a. front end adapters) for communicating with the host computer 102. Each computing node $116_1$-$116_4$ may also include one or more BEs 128 (back end directors, a.k.a. back end adapters) for communicating with respective associated back end storage bays $130_1$-$130_4$, thereby enabling access to managed drives 132. The managed drives 132 may include tangible persistent storage components of one or more technology types, for example and without limitation SCM, SSDs such as flash, and HDDs such as SATA and FC. Each computing node may also include one or more CAs (channel directors, a.k.a. channel adapters) 134 for communicating with other computing nodes via an interconnecting fabric 136. Each computing node may allocate a portion or partition of its respective local volatile memory 124 to a virtual shared "global" memory 138 that can be accessed by other computing nodes, e.g. via DMA (direct memory access) or RDMA (remote direct memory access).

The storage array 100 maintains data for the host applications running on the host computer 102. For example, host application 104 may write host application data to the storage array and read host application data from the storage array in order to perform various functions. Examples of host applications may include but are not limited to file servers, email servers, block servers and databases. A production device 140 and a corresponding host device 142 are created to enable the storage array to provide storage services to the host application 104. Without limitation, the production device 140 may be referred to as a production device, production volume, production LUN or host LUN, where LUN (Logical Unit Number) is a number used to identify the logical storage volume in accordance with the SCSI (Small Computer System Interface) protocol. The host device 142 is a local representation of the production device 140. Multiple host devices associated with different host computers may be local representations of the same production device. The host device and the production device are abstraction layers between the managed drives 132 and the host application 104. From the perspective of the host application, the host device 142 is a single data storage device having a set of contiguous fixed-size LBAs (logical block addresses) on which data used by the host application resides. However, the data used by the host application may actually be maintained by the computing nodes $116_1$-$116_4$ at non-contiguous addresses on various different managed drives.

In order to service IOs from the host application 104, the storage array 100 maintains metadata 144 that indicates, among various things, mappings between production device 140 storage space and the locations of extents of host application data on the managed drives. Further, there are multiple caching levels between the managed drives and the host application, not all of which will be described. In response to an IO 146 from the host application 104 to host device 142, the hypervisor/OS 112 determines whether the IO can be serviced by accessing the host computer memory 106. If that is not possible then the IO is serviced by to the storage array 100. There are multiple paths between the host computer 102 and the storage array 100, e.g. one path per FE 126. The paths may be selected based on a wide variety of techniques and algorithms including, for context and without limitation, performance and load balancing. In the case of a read IO the storage array uses the metadata 144 to locate the requested data, e.g. in the shared global memory 138 or managed drives 132. If the requested data is not in the shared global memory 138 then it is temporarily copied into the shared global memory from the managed drives 132 and sent to the host application via one of the computing nodes. In the case of a write IO the storage array marks the data as dirty and creates new metadata that maps the production device address with a location to which the data is written on the managed drives. The shared global memory may enable the production device to be reachable via all of the computing nodes and paths, although the storage array can be configured to limit use of certain paths to certain production devices.

Figure 2:
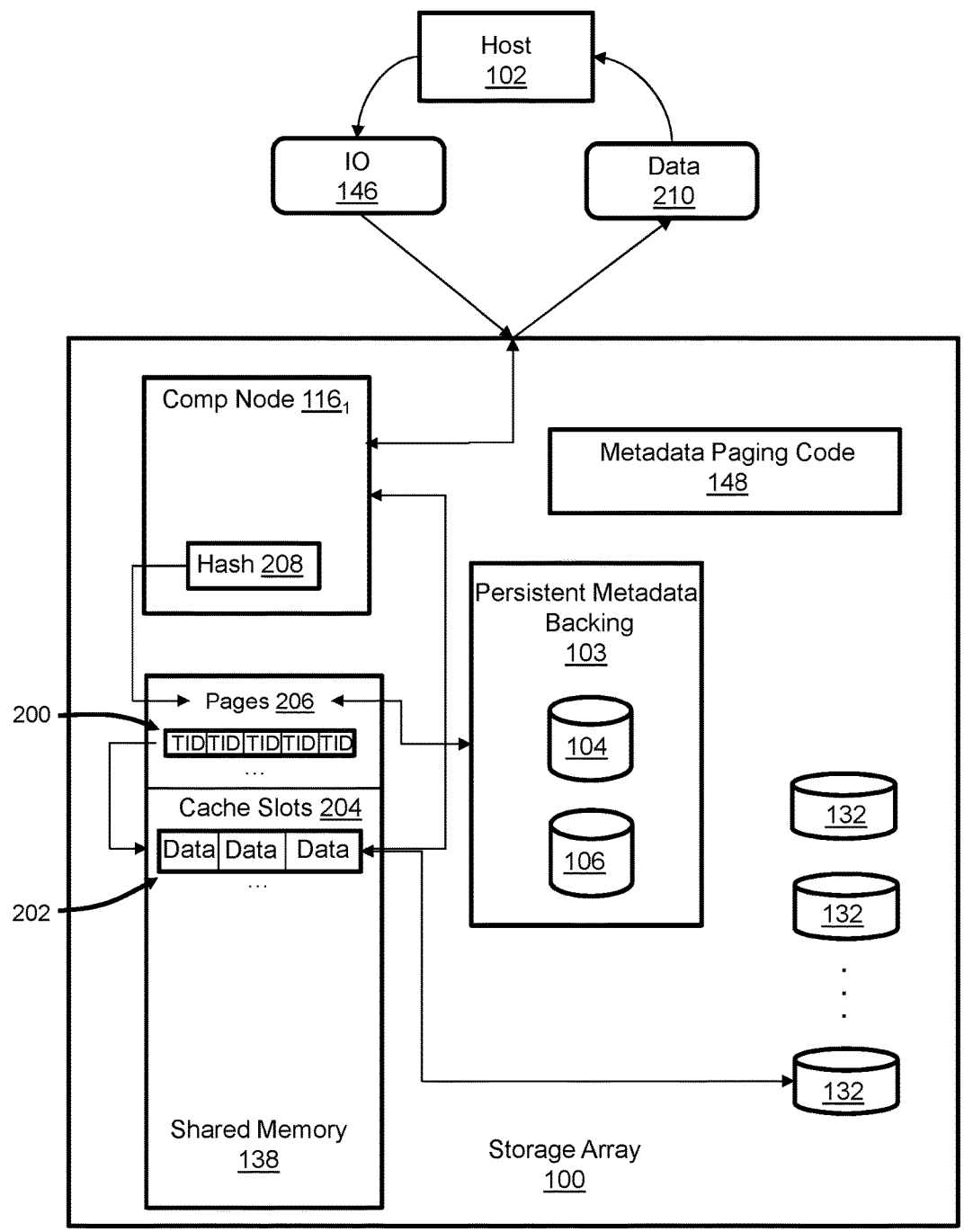
FIG. 2 illustrates metadata paging.

Referring to FIG. 2, one use of virtual memory is for metadata paging. Because maintaining all of the metadata of a storage array in RAM may be cost prohibitive, a portion of the metadata may be paged out to physical storage. Cached metadata may be in an allocated portion of the shared global memory 138 and include TIDs (track ID tables) 200 that contain pointers to host application data 202 located in cache slots 204 in another portion of the shared global memory 138 that is allocated for data. The TIDs may be maintained in fixed-size pages 206, e.g. and without limitation 4 KB, where each page holds multiple TIDs. The procedure for finding and utilizing a TID to satisfy an IO 146 received from the host computer varies depending on whether the TID is present in the shared global memory 138. The computing node, e.g. computing node $116_1$, may identify corresponding TIDs by inputting the device number, cylinder number, head (track) and size obtained from the IO 146 into a hash table 208. A wide variety of descriptive data structures could be used, of which hash table 208 is simply one example. The hash table 208 indicates the locations of TIDs in pages 206 in the shared global memory 138. If there is an entry in the hash table corresponding to the inputted information then the TIDs are present in the shared global memory 138. In other words, the TID is "IN," which is also known as a "cache hit." In the case of a cache hit the hash table outputs a corresponding page number. The page number is used to locate the page that holds the TIDs in the shared global memory. The TIDs are obtained from the shared global memory and used to find and retrieve the corresponding data from the cache slots 204. In the case of a Read IO the data 208 may then be returned to the host computer 102. In the absence of a corresponding entry in the hash table 208, i.e., when the TID is "OUT," which is also known as a "cache miss," the hash table 208 outputs an indicator that there is no such page frame referenced in the hash table. Assuming that the portion of the shared cache that is allocated for metadata pages is full, the computing node uses metadata paging code 210 to select and evict a page of metadata from the shared cache. A page for the required TIDs is then created in the shared memory or copied into the shared memory from the persistent metadata backing storage 212. The TIDs in the page that is being swapped into the shared memory may then be used to obtain the host application data from the managed drives 132 if that is what is required to service the IO. In particular, the data 210 may be copied from the managed drives into the cache slots and returned to the host computer as already described above. As will be explained in greater detail below, the metadata paging code 148 selects the page to evict from the shared cache based on service levels.

Figure 3:
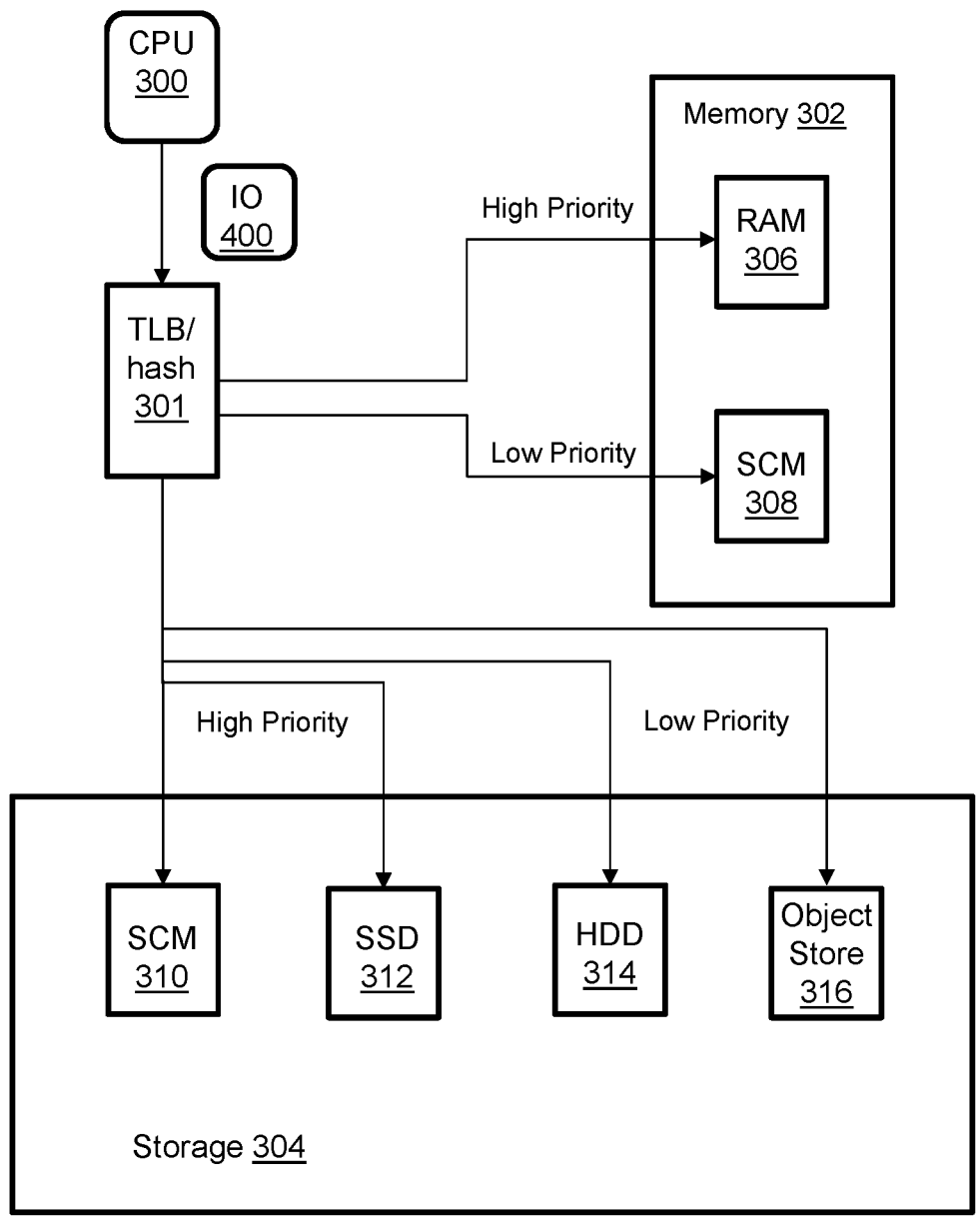
FIG. 3 illustrates aspects virtual memory service levels that may be implemented in the host computer, the storage array, and any of a wide variety of other nodes.
Figure 4:
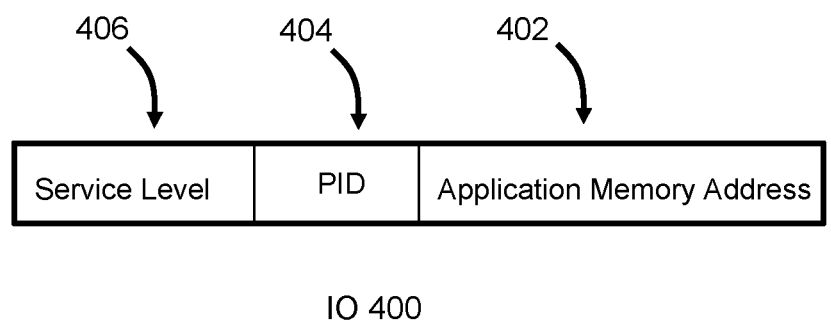
FIG. 4 illustrates an IO with a service level indicator.

FIG. 3 illustrates aspects virtual memory service levels that may be implemented in the host computer, the storage array, and any of a wide variety of other nodes. A CPU 300 associated with one the processors described above generates an IO 400 that is provided to a TLB or hash table 301. Feature 301 will be referred to as a TLB/hash table but in this disclosure the term TLB is intended to include any feature that provides the functionality of a TLB, including but not limited to the storage array hash table described above. The TLB helps to oversubscribe physical memory 302 by providing a way to map virtual address space to physical address space and swap memory pages between physical memory 302 and physical storage 304 according to the access patterns. An example of the IO 400 is shown in FIG. 4. The illustrated example includes an application memory address 402, a PID (Process ID) 404 and a service level 406. The service level 406 indicates a priority associated with the application that generated the IO, or a priority associated with a particular function of that application, e.g. and without limitation a value from 1-5 where 1 is highest priority and 5 is lowest priority. The PID 404 may be used to associate the IO with an area of storage 304 or memory 302 allocated to that process. The application memory address 402 is a virtual address for which there is a corresponding physical address that is unknown to the application. When the application memory address 402 is present in the TLB/hash table 301, the process is able to access the memory 302 to service the IO, e.g. read or write data. When the application memory address is not present in the TLB/hash table then a page table must be used to find the physical address in storage 304. The page is then copied from that address in storage 304 to an address in memory 302, and the application memory address is copied into the TLB.

One aspect of virtual memory service levels is physical memory bias. In the illustrated example the physical memory 302 includes, in descending order of performance, RAM 306 and SCM 308. A priority mechanism in the TLB/hash table 301 may bias usage of those resources by utilizing SCM 308 for low priority applications (as indicated by the service level) and utilizing RAM 306 for high priority applications (as indicated by the service level). This preserves the lower latency RAM 306 of physical memory 302 for pages associated with high priority applications and can improve the performance of those applications. A wide variety of techniques may be utilized to determine how to share physical memory resources between higher and lower priority applications. For example and without limitation, some types of memory resources, or portions thereof, may be exclusively allocated based on service level. Alternatively, or additionally, the highest performance (lowest latency) resources may be fully utilized before utilizing the next lower performance type of resources. Those of ordinary skill in the art will select from the various techniques as an implementation detail.

Another aspect of virtual memory service levels is page table media bias. In the illustrated example the physical storage 304 includes, in descending order of performance, SCM 310, SSDs 312, HDDs 314 and an object store 316. The priority mechanism of the TLB/hash table 301 may place pages for high priority applications in higher performance storage resources such as SCM 310 and SSDs 312, and place pages for low priority applications in lower performance storage resources such as HDDs 314 or object store 316. This preserves the lower latency SCM 310 and SSDs 312 for pages associated with high priority applications and can further improve the performance of those applications. A wide variety of techniques may be utilized to determine how to share physical storage resources between higher and lower priority applications. For example and without limitation, some types of storage resources, or portions thereof, may be exclusively allocated based on service level. Alternatively, or additionally, the highest performance (lowest latency) resources may be fully utilized before utilizing the next lower performance type of resources. Those of ordinary skill in the art will select from the various techniques as an implementation detail.

Figure 6:
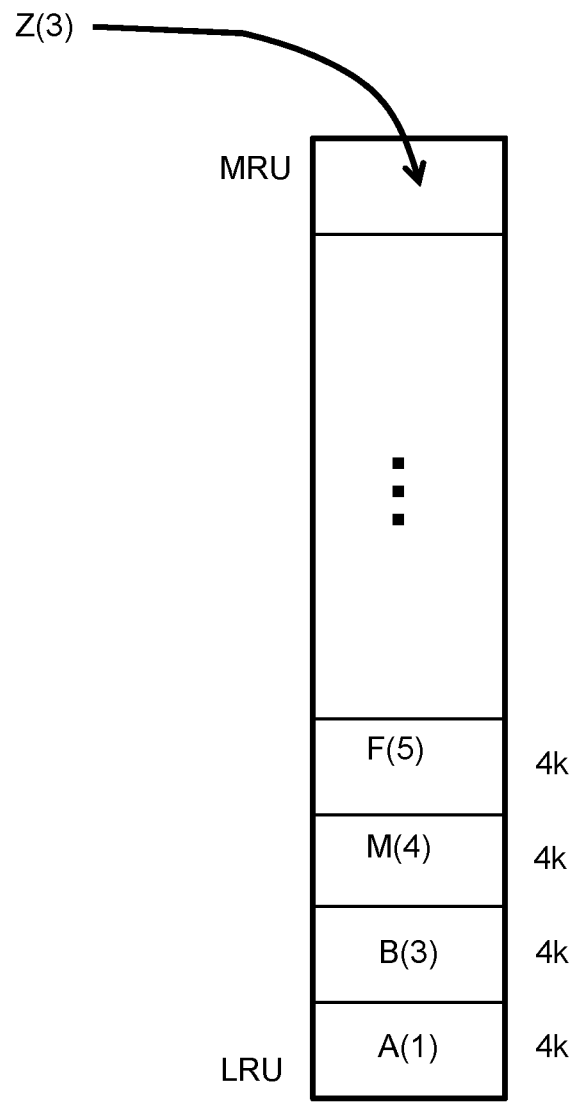
FIG. 6 illustrates a queue of addresses/pages ordered by most recent use (access).

Referring now to FIGS. 5 and 6, another aspect of virtual memory service levels is physical memory eviction bias. When pages are created, copied or moved in memory it may be necessary to evict other pages from memory in order to create the required space. For example, when a TLB miss occurs and a virtual memory address must be evicted then the service level (priority) is used to bias the eviction by using a random probability table 500. The table represents the probability that an attempt to evict a selected address will be allowed. The underlying replacement policy is not directly influenced, but when an address is selected the probability is used to determine whether to evict or select the next candidate. As specifically shown in FIG. 6, candidate selection may be in order of recent use. In order to make space in memory for a page Z with a service level 3, for example, the LRU (Least Recently Used) address is selected first, i.e. the address containing page A with a service level 1. As indicated in the probability table 500, service level 1 is associated with a 20% eviction probability. A stochastically calculated value is used to determine whether to evict page A at 20% probability. If the process does not result in eviction of page A then the next LRU address is selected, i.e. the address containing page B with a service level 3. As indicated in the probability table 500, service level 3 is associated with a 50% eviction probability. A stochastically calculated value is used to determine whether to evict page B at 50% probability. If an address is not selected for eviction before the address associated with page F then page F is evicted because as indicated in the probability table 500, service level 5 is associated with a 100% eviction probability. The probabilities shown in the example are not to be viewed as limiting. Any of a wide variety of probabilities could be implemented.

Referring now to FIG. 7, another aspect of virtual memory service levels is page-in bias. A single page is the smallest unit of data that can be moved between memory and storage. When data associated with an address is requested in an IO, the entire page that contains that address is typically copied from storage into memory rather than only the blocks at the specified address. Page-in bias prioritizes page-in by scaling the number of pages copied into memory based on the service level in the IO. The illustrated page-in bias table 700 indicates a 1× scalar for service level 5, a 2× scalar for service level 4, a 4× scalar for service level 3, an 8× scalar for service level 2, and a 16× scalar for service level 1. The scalar indicates how many contiguous pages relative to the page that contains the requested address are copied into memory from storage in response to an IO with the given service level. For example, 1 page (the page containing the requested address) is copied into memory for an IO with service level 5, whereas 4 pages (the page containing the requested address and three more pages contiguous therewith) are copied into memory for an IO with service level 3. 2 bits may be added to each TLB entry to indicate the scalar with which the address was loaded into memory. Some applications access proximally located virtual addresses in close temporal proximity so copying contiguous pages with adjacent virtual addresses into memory may improve application performance by increasing the likelihood of TLB hits.

Referring to FIG. 8, the page-in bias may be dynamically adjusted. A hit rate table is created for each host application, e.g. hit rate table 800 for host application 104. The hit rate table indicates the TLB hit rate for an application by scalar. In other words, for an application of service level 1 the table will indicate hits for the page containing the requested address and the hits for the groups of pages out to the 16× scalar. The table provides an indication of the usefulness and efficiency of loading additional pages further away from the requested address. For example, if a process has a sparse memory access pattern, the 2×-8× scalar hit rates will be much lower than the 1× hit rate. One response is to tag the low hit rate pages for eviction. Another response is to adjust the scalar for that application. For example, a priority 1 application associated with a sparse access pattern could have a scalar adjusted from 16× to 1×. The scalar adjustment may be temporary. For example, at least some IOs associated with an adaptively reduced scalar may be permitted to utilize the full scalar associated with the service level because access patterns, and thus hit distribution, may change over time. An inverted probabilistic mechanism may be used by the eviction policy towards the multiplier when servicing TLB miss and filling 1×, 2×, 4×, and 8×, e.g. the lower the priority the lower the probability that it can attempt an 8× TLB fill.

Figure 9:
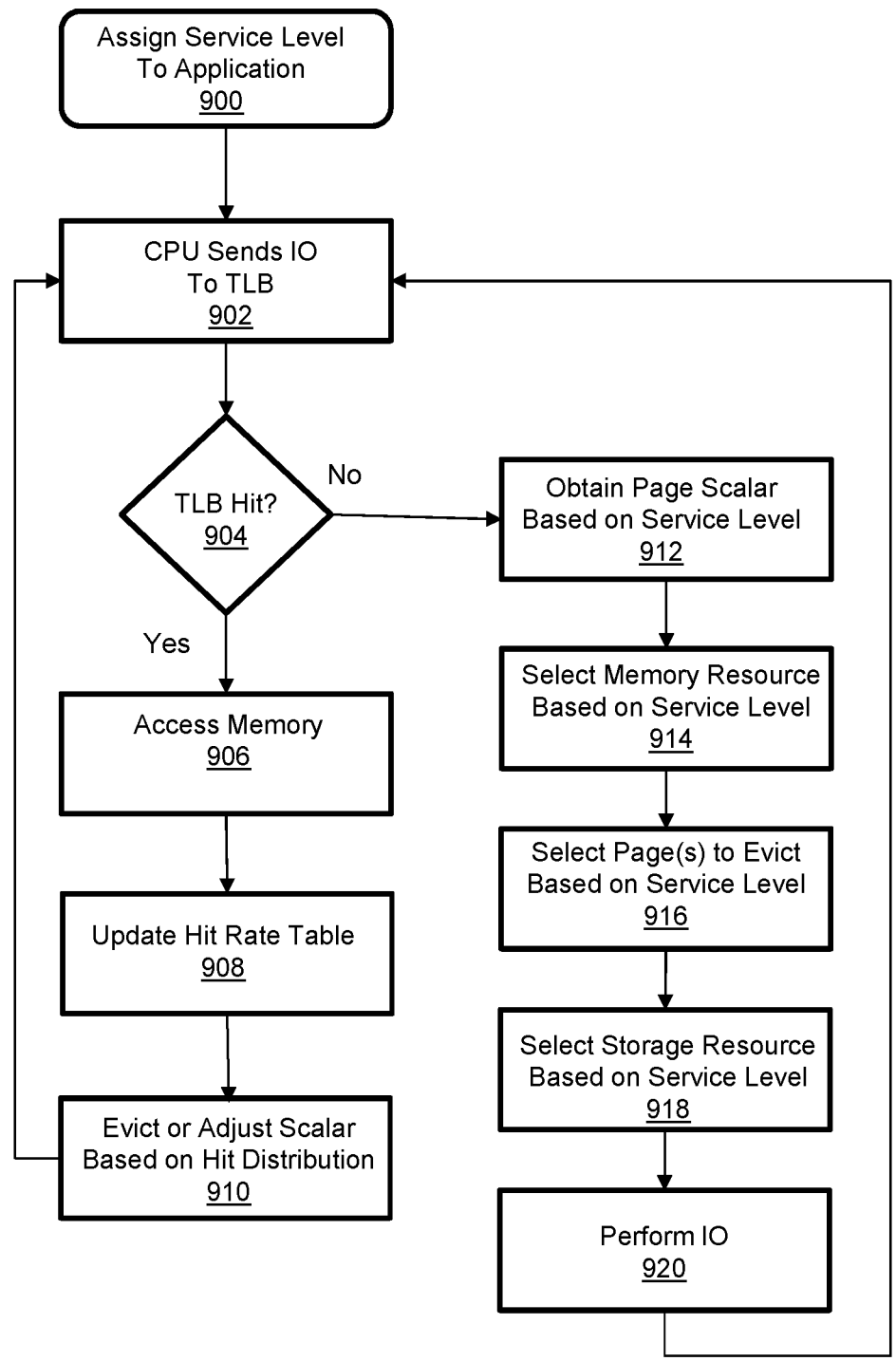
FIG. 9 illustrates a method of using virtual memory service levels.

FIG. 9 illustrates a method of using virtual memory service levels. A service level is assigned to an application as indicated in block 900. In some implementations the service level may be assigned to types of applications, processes or other features, but for purposes of explanation each application is assigned a service level. When the application is running and an access by the CPU cannot be satisfied from cache the CPU sends an IO to the TLB as indicated in block 902. The IO includes a service level indicator that indicates the service level of the application. In the event of a TLB hit, as determined in block 904, the memory is accessed at the physical address corresponding to the virtual address in the IO as indicated in block 906. The hit rate table is updated based on the memory access as indicated in block 908. In particular, the number of hits for the scalar corresponding to the accessed page is incremented. Pages corresponding to sparsely hit scalars after some period of time may be evicted, or the scalar may be adjusted based on hit distribution as indicated in block 910. In the event of a TLB miss, as determined in block 904, a page scalar is obtained from the page-in bias table based on service level as indicated in block 912. A memory resource is selected based on the service level as indicated in block 914. For example, a low latency memory resource may be selected for a high priority application and a higher latency memory resource may be selected for a lower priority application. If the selected memory resource does not have enough free space to accommodate the number of pages indicated by the obtained scalar then pages are selected for eviction based on service level as indicated in block 916, e.g. using a service level-eviction probability table. Physical storage resources for the pages selected for eviction as selected based on the service level(s) of the application(s) associated with those pages as indicated in block 918, e.g. a low latency storage resource may be selected for a high priority application and a higher latency storage resource may be selected for a lower priority application. The IO is performed as indicated in block 920 by evicting the selected pages to the selected storage resources and utilizing the selected pages in memory, e.g. by copying in pages from storage. The TLB tables are updated based on the pages that were paged-in and paged-out.

Specific examples have been presented in order to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
   a physical memory;
   physical storage comprising a plurality of types of storage devices, each type differentiated from the other types by performance;
   at least one CPU (central processing unit) with applications running thereon, each application having a service level assigned thereto, the at least one CPU generating a first data access request associated with a first one of the applications, the first data access request comprising a virtual address;
   a TLB (translation lookaside buffer) responsive to the first data access request to determine that the virtual address does not correspond to a physical address in a physical memory, and to select a page for eviction from the memory to physical storage in order to free space for use in servicing the first request,
   wherein the selected page is paged-out to a type of storage device that is selected by the TLB based on the service level of the application associated with the selected page.

2. The apparatus of claim 1 wherein the physical memory comprises a plurality of types of memory devices, each type differentiated from the other types by performance, and wherein a page is paged-in from the physical storage to a type of memory device that is selected by the TLB based on the service level of the application associated with the page.

3. The apparatus of claim 1 wherein the first request comprises an indicator of the service level of the first application.

4. The apparatus of claim 1 wherein the TLB obtains a page scalar based on the service level of the first application, the page scalar indicating a number of contiguous pages to be paged-in to the physical memory from the physical storage in response to the first request.

5. The apparatus of claim 1 wherein the TLB selects the page for eviction from the memory based on the service levels of applications associated with pages in the memory.

6. The apparatus of claim 5 wherein each service level is associated with an eviction probability.

7. The apparatus of claim 6 wherein the pages in memory are considered for eviction in order of recent use from least recently used to most recently used.

8. The apparatus of claim 4 wherein the TLB is responsive to a second data access request to determine that a virtual address in that second request corresponds to a physical address in the physical memory, and to update a record of access to a page in the physical memory corresponding to the second request, including indicating whether the access is to a contiguous page paged-in in accordance with the page scalar.

9. The apparatus of claim 8 comprising evicting from the physical memory the contiguous page paged-in in accordance with the page scalar based on number of hits.

10. The apparatus of claim 8 comprising adjusting the page scalar of the application associated with the second data access request based on number of hits.

11. A method comprising:
    in a node comprising a physical memory and physical storage comprising a plurality of types of storage devices, each type differentiated from the other types by performance, a TLB (translation lookaside buffer), and at least one CPU (central processing unit) with applications running thereon:
    assigning a service level to each application;
    the at least one CPU generating a first data access request associated with a first one of the applications, the first data access request comprising a virtual address;
    the TLB, responsive to the first data access request, determining that the virtual address does not correspond to a physical address in a physical memory;
    selecting a page for eviction from the memory to physical storage in order to free space for use in servicing the first request;
    selecting a type of storage device based on the service level of the application associated with the selected page; and
    paging-out the selected page to the selected type of storage device.

12. The method of claim 11 wherein the physical memory comprises a plurality of types of memory devices, each type differentiated from the other types by performance, and comprising selecting a type of memory device based on the service level of the application associated with the page to be paged-in, and paging-in the page to the selected type of memory device.

13. The method of claim 11 comprising inserting, into the first request, an indicator of the service level of the first application.

14. The method of claim 11 comprising obtaining a page scalar based on the service level of the first application, the page scalar indicating a number of contiguous pages to be paged-in to the physical memory from the physical storage in response to the first request, and paging-in the indicated number of contiguous pages.

15. The method of claim 11 comprising selecting the page for eviction from the memory based on the service levels of applications associated with pages in the memory.

16. The method of claim 15 comprising associating an eviction probability with each service level.

17. The method of claim 16 comprising considering the pages in memory for eviction in order of recent use from least recently used to most recently used.

18. The method of claim 14 comprising, responsive to a second data access request, determining that a virtual address in that second request corresponds to a physical address in the physical memory, and updating a record of access to a page in the physical memory corresponding to the second request, including indicating whether the access is to a contiguous page paged-in in accordance with the page scalar.

19. The method of claim 18 comprising evicting from the physical memory the contiguous page paged-in in accordance with the page scalar based on number of hits.

20. The method of claim 18 comprising adjusting the page scalar of the application associated with the second data access request based on number of hits.

* * * * *